United States Patent [19]

Killen et al.

[11] Patent Number: 5,253,311
[45] Date of Patent: Oct. 12, 1993

[54] DEVICE AND METHOD FOR PERFORMING OPTICAL COUPLING WITHOUT PIGTAILS

[75] Inventors: Albert K. Killen, Athens; Cassie M. Lofts, Harvest, both of Ala.

[73] Assignee: The United States of America as represented by the Secretary of the Army, Washington, D.C.

[21] Appl. No.: 970,460

[22] Filed: Nov. 2, 1992

[51] Int. Cl.⁵ .............................................. G02B 6/42
[52] U.S. Cl. ...................... 385/14; 385/129; 385/88; 385/92
[58] Field of Search .................... 385/14, 31, 49, 129, 385/130, 88, 92

[56] References Cited

U.S. PATENT DOCUMENTS

| | | | |
|---|---|---|---|
| 4,802,727 | 2/1989 | Stanley | 385/92 X |
| 5,046,808 | 9/1991 | Chang | 385/14 X |
| 5,103,494 | 4/1992 | Mozer | 385/14 |

Primary Examiner—John D. Lee
Assistant Examiner—Hemang Sanghavi
Attorney, Agent, or Firm—Freddie M. Bush; Hay Kyung Chang

[57] ABSTRACT

Micromachined depressions are created at a surface of lithium crystal/waveguide composite and suitable optical components are inserted into these depressions and precisely aligned with waveguides so that light can be coupled into and out of the waveguides without fiber pigtails. The optical components can be independent or be a part of a mating unit which may incorporate appropriate electronics to support the optical components. Instant invention produces an application-ready integrated optics chip without the necessity for labor-intensive pigtailing or for separate provision of supporting electronics after the user acquires commercially available lithium crystal/waveguide composite.

1 Claim, 3 Drawing Sheets

DEVICE AND METHOD FOR PERFORMING OPTICAL COUPLING WITHOUT PIGTAILS

DEDICATORY CLAUSE

The invention described herein may be manufactured, used, and licensed by or for the Government for governmental purposes without the payment to us of any royalties thereon.

BACKGROUND OF THE INVENTION

Integrated optics chips are usually made of lithium crystal/waveguide composite which is made of a suitable lithium crystal substrate, such as lithium niobate (LiNbO$_3$), and one or more waveguides that are embedded in the substrate in various geometries and run through the length of the substrate. Current methods for coupling light into and out of integrated optics chips, which are available for commercial uses, all depend on physically attaching optical fibers to one or more ends of the embedded waveguide(s). Such attaching effort is known as "pigtailing". However, pigtailing has the serious drawback of requiring the performance of a precise alignment of the waveguide and the fiber using a complicated optical bench setup and the use of epoxy to maintain the fiber in the desired place.

Pigtailing is labor-intensive, unsuitable for high-volume production of integrated optics chips that are factory-ready for optical coupling application and does not result in a design robust enough for use in military environments. Furthermore, the epoxies used can cause mechanical alignment failures due to temperature changes and expansion in the fibers. Also, commercially available integrated optics chips do not have electronics in or on them, necessitating the end user to supply the supporting electronics separately and make their own electrical connections to the chips.

SUMMARY OF THE INVENTION

A micromachined depression or a shelf is created at a surface of the lithium crystal substrate to coincide with an end of the embedded waveguide and into this depression is inserted a miniature optical component, usually a laser source or a detector fabricated in semiconductor material. The component is set flush against the common side shared by the depression and the waveguide. Such a method of coupling light into and out of the waveguide eliminates the need for pigtailing.

DESCRIPTIONS OF THE DRAWINGS

DESCRIPTION OF A PREFERRED EMBODIMENT

Figure 1:
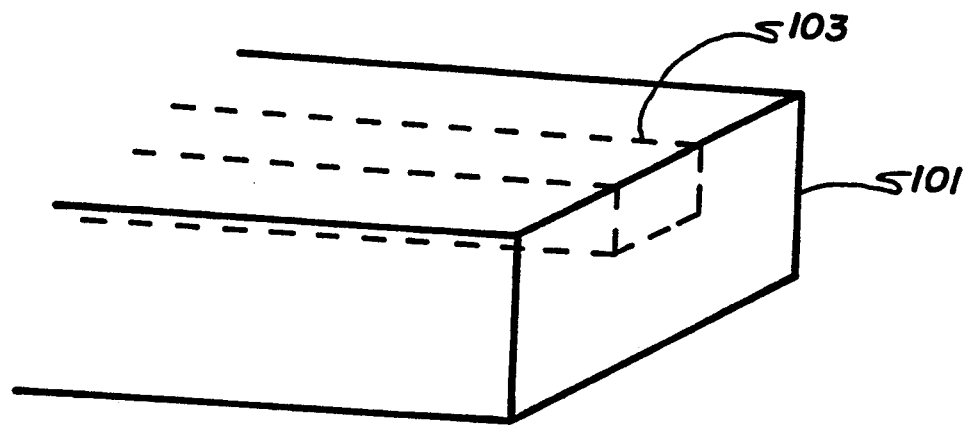
FIG. 1 is a diagram of lithium crystal substrate with a waveguide embedded in it.

Turning now to the figures wherein like numbers refer to like parts, FIG. 1 depicts a diagram of a block of lithium crystal substrate 101 with waveguide 103 embedded in it.

Figure 2:
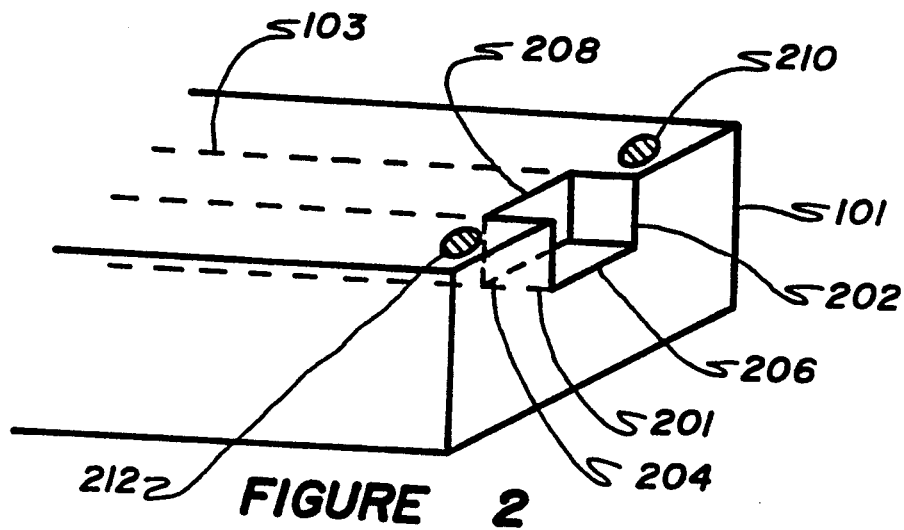
FIG. 2 shows a micromachined depression at a surface of the substrate, the depression coinciding with an end of the waveguide.
Figure 3:
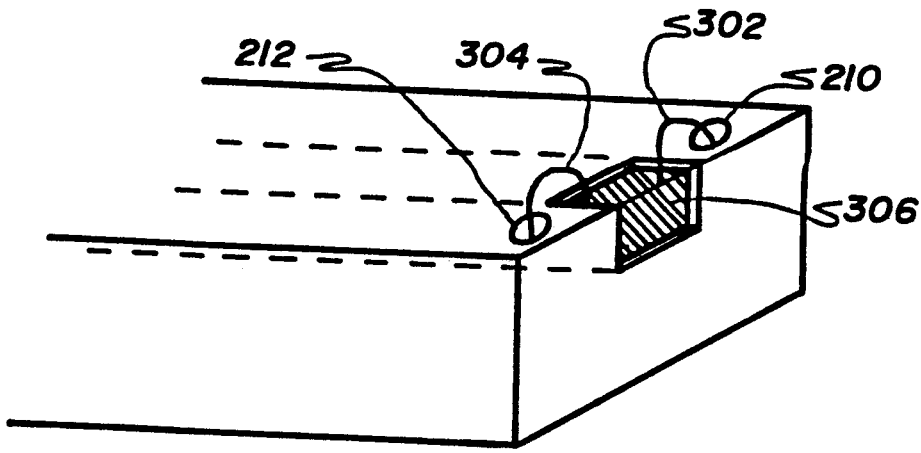
FIG. 3 shows the same surface of the substrate but now with into the depression.

FIG. 2 shows a micromachined depression 201 in the shape of a rectangular shelf which is created at one surface of the substrate/waveguide composite by a suitable method such as laser ablation. Depression 201 can be of any size and shape desired to accommodate a given optical component which will be inserted in it. If in rectangular shape, the depression has two opposing sides 202, 204, a bottom side 206 and a common side 208 which is shared by depression 201 and embedded waveguide 103. Common side 208 can be made to be any angle, relative to the substrate, necessary for the application to which depression 201 will be put. But the common side, whatever its angle, should be polished to optimize optical coupling to and from the wave guide.

Next, flush against common side 208 of the depression, optical component 306 is inserted to be precisely aligned with the waveguide. Optical component 306 usually is a laser source or a detector but can be any other suitable optical component. Component 306 is held in place by the use of a suitable optical epoxy. Electrode pads 210 and 212 positioned on top surface of substrate 101, one on either side of depression 201, empower the component inserted into the depression. Wirebonds 302 and 304 provide the empowering connection between the component and pads 210 and 212, respectively.

The above-described arrangement of inserting an optical component into depression 201 so that the optical component comes in direct contact and precise alignment with an end of waveguide 103 eliminates the need for labor-intensive pigtailing between the waveguide and the component via fragile optical fibers. The arrangement renders itself adaptable to high volume production of application—ready integrated optics chips, is less susceptible to external damages, and results in a smaller, more compact and robust device having a more stable alignment of optical component with the waveguide.

Figure 4:
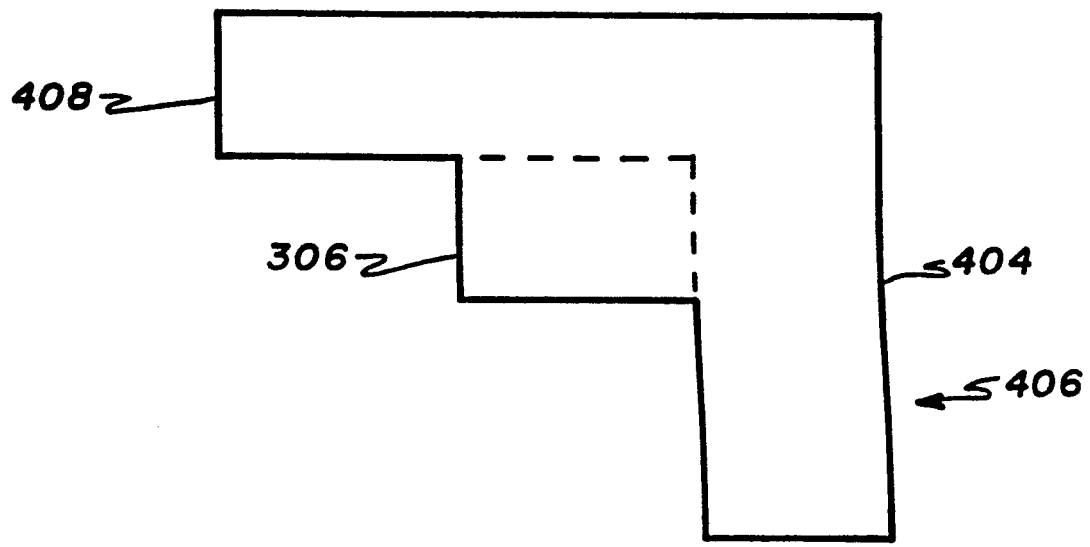
FIG. 4 shows a side-view diagram of a preferred mating unit configuration suitable for insertion into the depression.
Figure 5:
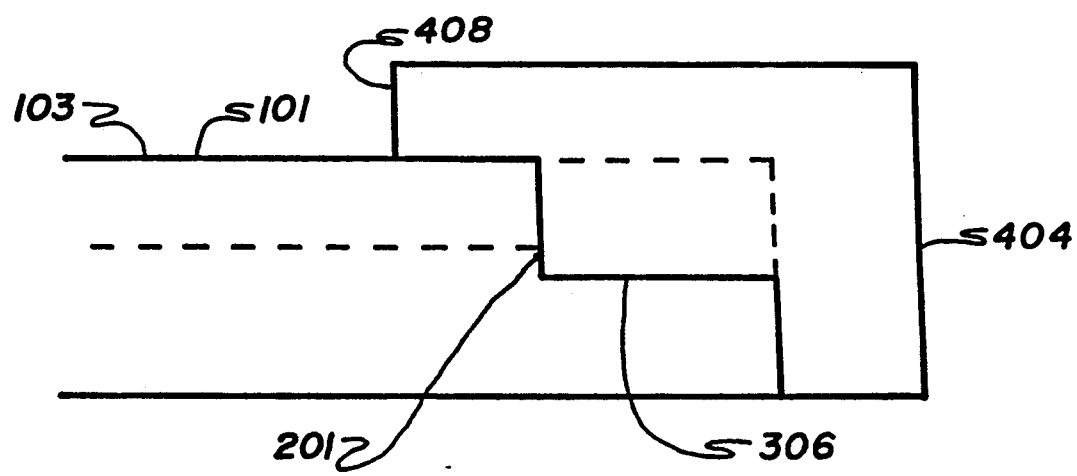
FIG. 5 represents a side-view of how the preferred mating unit fits depression.

FIG. 4 shows a side-view diagram of a preferred configuration of the mating unit to be inserted into depression 201. Optical component 306, which is usually a laser source or detector but can be any other suitable optical component, is a protrusion that is permanently affixed to an outer surface of semiconductor housing 404 and is the portion of mating unit 406 that is actually inserted into depression 201 to be aligned with waveguide 103. Electronics to support the component may be housed suitably in or on semiconductor housing 404 and thusly become an integral part of mating unit 406. Cap 408 which extends from housing 404 above component 306 provides protection to the component from external damage as illustrated in FIG. 5 and also affords stability to mating unit 406 in its mating with the lithium crystal/waveguide composite. Cap 408 may also house electronics to support component 306.

Figure 6:
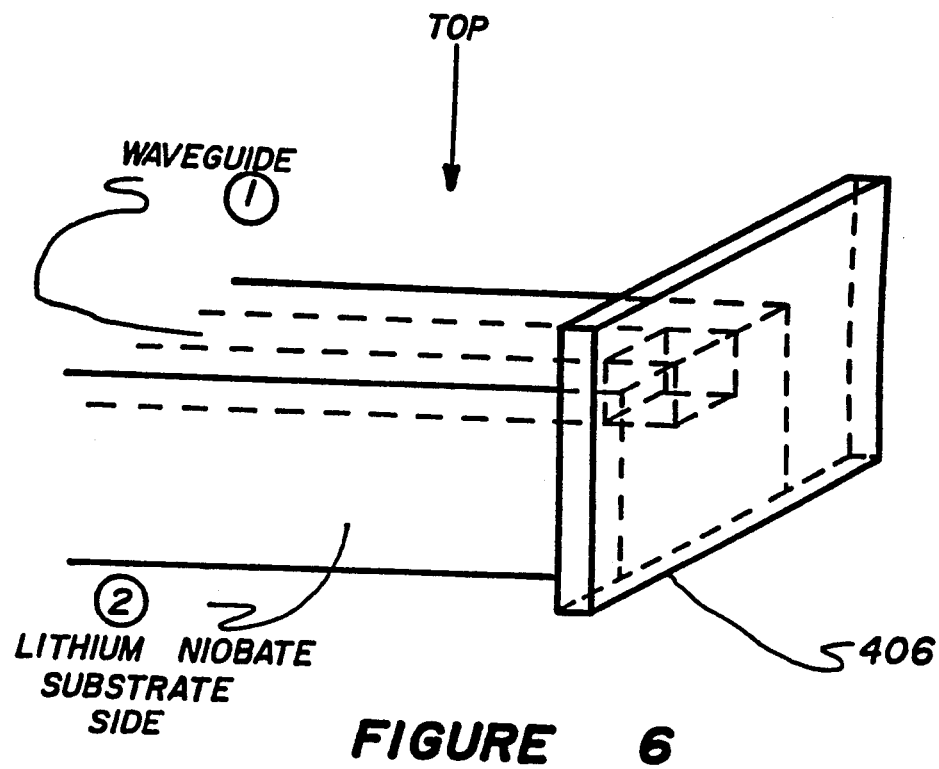
FIG. 6 is an end-view of lithium crystal/waveguide composite mated with the mating unit having one protrusion.
Figure 7:
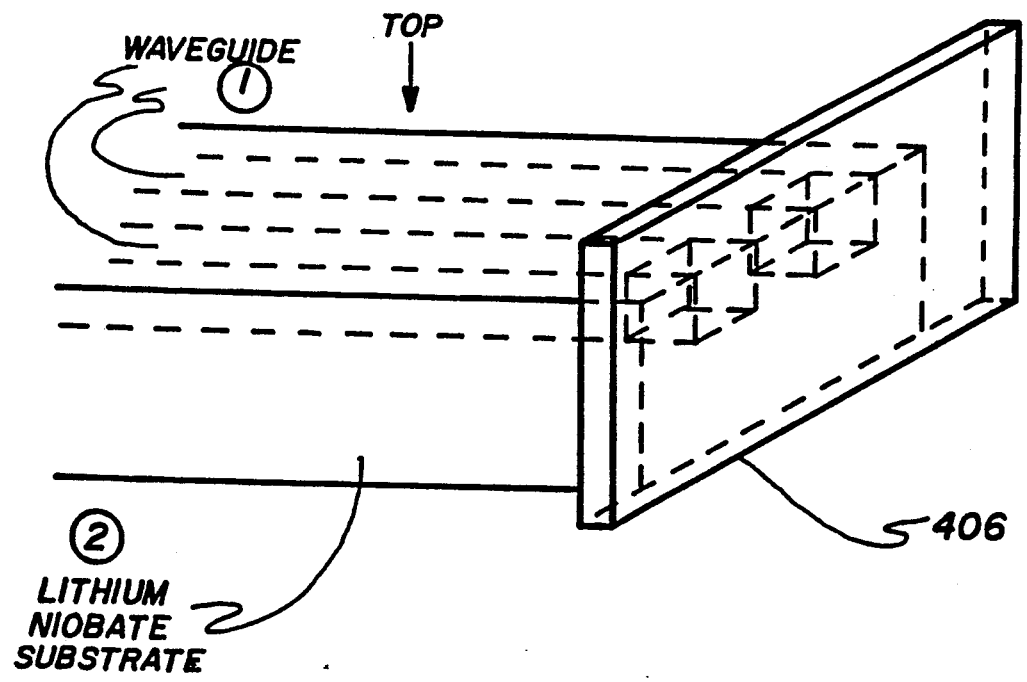
FIG. 7 illustrates an integrated optics chip having multiple depressions and multiple protrusions inserted into them.

An end-view of an integrated optics chip with mating unit 406 inserted into depression 201 is presented in FIG. 6. Of course, it is obvious that a given lithium crystal/waveguide composite may have a plurality of depressions into which a mating unit having thereon a plurality of components may be inserted as depicted in FIG. 7.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claim appended hereto.

We claim:

1. A device for coupling light into and out of a waveguide, said device comprising:

a lithium crystal substrate having a depression on one surface thereof, said substrate further having a waveguide embedded therein, said waveguide terminating at said depression such that the terminating end of said waveguide shares a common side with said depression; and a mating unit, said unit being suitable for coupling with said substrate and comprising a semiconductor housing, at least optical component, said component being affixed on said housing and being adapted for insertion into said depression to be aligned with said waveguide such that a radiant communication exists between said waveguide and said component and a cap, said cap being affixed to said housing and extending above said component to protect said component from external damage and assist in the insertion of the same into said depression.

* * * * *